United States Patent [19]

Mattes et al.

[11] Patent Number: 5,420,081
[45] Date of Patent: May 30, 1995

[54] PREPARATION OF FULLERENE/GLASS COMPOSITES

[75] Inventors: Benjamin R. Mattes; Duncan W. McBranch, both of Santa Fe; Jeanne M. Robinson, Los Alamos; Aaron C. Koskelo, Los Alamos; Steven P. Love, Los Alamos, all of N. Mex.

[73] Assignee: The Regents of the University of California Office of Technology Transfer, Alameda, Calif.

[21] Appl. No.: 221,421

[22] Filed: Mar. 31, 1994

[51] Int. Cl.⁶ .............................................. C03C 14/00
[52] U.S. Cl. ............................................ 501/12; 501/32
[58] Field of Search ............................... 501/12, 32, 54

[56] References Cited

U.S. PATENT DOCUMENTS 5,172,278 12/1992 Tutt ..................................... 359/885
5,200,334 4/1993 Dunn et al. ....................... 501/12 X
5,270,027 12/1993 Balducci et al. .................. 501/12 X

OTHER PUBLICATIONS

Zerda et al, "Diffusion of $C_{60}$ In Porous Sol–Gel Glass", J. Non–Cryst. Solids (1994), 168(1–2), 33–41.
D. Avnir et al., "The Encapsulation of Organic Molecules and Enzymes in Sol–Gel Glasses: Novel Photoactive, Optical, Sensing, and Bioactive Materials. A Review," NTIS No. AD–A244 154/1/HDM, Report No. R/D–5548–MS–01 (1992) no month.
S. J. Kramer et al., "Polyaniline–ORMOSIL Nanocomposites," in *Chemical Processing of Advanced Materials* (John Wiley and Sons, Inc., New York, 1992), Chap. 65, p. 737 no month.
Sheng Dai et al., "Preparation of $C_{70}$–doped Solid Silica Gel via Sol–Gel Process," J. Am. Ceram. Soc. 75, 2865 (1992) no month.
L. Esquivias et al., "Sonogels: An Alternative Method in Sol–Gel Processing" in *Proceedings of the Third International Conference on Ultrastructure Processing*, (John Wiley & Sons, Inc., New York, 1988), p. 255 no month.

*Primary Examiner*—Karl Group
*Attorney, Agent, or Firm*—Samuel M. Freund

[57] ABSTRACT

Synthesis of fullerene/glass composites. A direct method for preparing solid solutions of $C_{60}$ in silicon dioxide ($SiO_2$) glass matrices by means of sol-gel chemistry is described. In order to produce highly concentrated fullerene-sol-gel-composites it is necessary to increase the solubility of these "guests" in a delivery solvent which is compatible with the starter sol (receiving solvent). Sonication results in aggregate disruption by treatment with high frequency sound waves, thereby accelerating the rate of hydrolysis of the alkoxide precursor, and the solution process for the $C_{60}$. Depending upon the preparative procedure, $C_{60}$ dispersed within the glass matrix as microcrystalline domains, or dispersed as true molecular solutions of $C_{60}$ in a solid glass matrix, is generated by the present method.

10 Claims, No Drawings

PREPARATION OF FULLERENE/GLASS COMPOSITES

The invention was made with government support under Contract No. W-7405-ENG-36 awarded by the U.S. Department of Energy to The Regents of the University of California. The Government has certain rights in the invention.

FIELD OF THE INVENTION

The present invention relates generally to a direct method for preparing solid solutions of buckminsterfullerenes ($C_{60}$) and derivatives thereof and, more particularly, to the use of sol-gel chemistry to prepare microscopically dispersed $C_{60}$ and derivatives thereof in a silicon dioxide ($SiO_2$) glass matrix.

BACKGROUND OF THE INVENTION

The chemical behavior of $C_{60}$ and $C_{70}$ (fullerenes) is similar to those of linear quasi-one-dimensional conducting polymers, such as polyacetylene, in several important ways. This similarity is due, in part, to an extended network of conjugated polarizable delocalized $\pi$-electrons which are distributed over the spherical fullerene surface. As is the case with many conjugated polymers, the electrical conductivity of $C_{60}$ and $C_{70}$ can be tailored to span the insulating, semiconducting, and metallic regimes by controlled n-type doping. Fullerenes and derivatives thereof also possess unique nonlinear optical properties such as optical limiting. The optical properties of these materials are similarly due to the highly polarizable conjugated $\pi$-electrons. However, obstacles to using fullerenes for nonlinear optical and semiconductor applications include their environmental instability under ambient conditions, and the fact that optical quality components are not easily manufactured from the neat materials. Since environmental factors are known to cause chemical modification of the fullerenes that effect these important electronic and optical properties, it becomes important to protect the $C_{60}$ and derivatives thereof, in order to preserve their unique electrooptical properties in device applications.

Composites of fullerenes in optical glass matrices would be of interest for applications including optical limiting and nonlinear optical waveguides. Several authors have reported optical limiting in $C_{60}$ organic solutions. This limiting effect is due to the very efficient intersystem crossing; that is, there is a significant triplet-triplet absorption in the visible spectral region, following photoexcitation into a singlet excited state. As the incident light intensity increases, the transmitted intensity is limited, approaching a constant value ($<15$ mJ/cm$^2$) at high laser input intensities. Optical limiting would be useful for eye protection from pulsed laser light if fullerenes were to be protected in an optically transparent isolation matrix. In U.S. Pat. No. 5,172,278 for "Buckminsterfullerenes For Optical Limiters," which was issued to Lee W. Tutt on Dec. 15, 1992, it is suggested that $C_{60}$ compounds may be embedded in a host matrix of a substantially transparent material, such as silicon oxide, silicon nitride, silicon oxynitride, and transparent plastics, such as polycarbonate, polymethyl methacrylate, paralene, styrene, and the like, in order to make composite films. However, no description was provided as to how such embedding might be achieved, and there was no indication that useful bulk samples might be synthesized.

Large values have been reported for the nonresonant third-order optical susceptibility $\chi^{(3)}$ for $C_{60}$. This value is expected to increase, as a function of increasing electron density in n-doped $C_{60}$, as well as in higher order fullerenes (and their doped derivatives). This physical property permits the control of light using light for optical switching applications.

A frequently encountered synthetic procedure in sol-gel chemistry involves the polymerization of a metal alkoxide followed by densification to form a fully dense glass. This procedure is known to lead to high optical quality glasses and may be used to include optically active organic species at reduced temperatures compared to conventional melt processing. Formation of glasses by this procedure is a four-step process consisting of solution formation, gelation, drying, and densification. Solutions are formed by mixing metal alkoxides together with a sol-compatible solvent and water, in the presence of an acid or base catalyst. The hydrolysis reaction of a silicon alkoxide produces silanol groups (Si—OH), which subsequently polymerize to form siloxane (Si—O—Si) rings and chains. The following reaction illustrates the acid-catalyzed hydrolysis of tetraethylorthosilicate (TEOS) to form a silica gel:

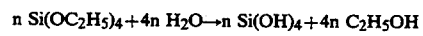

The concentration of water in the sol plays an important role for this synthetic route leading to porous gels. It is apparent, from balancing these equations, that the minimum amount of water necessary to hydrolyze the alkoxide reaction is 2 moles of water per mole of Si. A minimal amount of water in the sol (2.5 mole ratio of Si to $H_2O$) is desired for gel synthesis.

Gelation occurs as the condensation polymerization reaction progresses. Solutions are typically covered with a semi-permeable barrier that allows reaction products to slowly evaporate with time. Homogenous dispersions of primary silica particles having approximately 1–2 nm diameter, coalesce during the early stage of the hydrolysis reaction. Secondary particles condense into 5–10 nm diameter aggregates. The intrinsic viscosity of the solution increases until the solution no longer flows. Gelation occurs at this irreversible sol-gel transition point. At this stage small pinholes are added to the barrier to accelerate the removal of the remaining liquid phase. During the drying period, cross-linking between the secondary particles continues to occur and the bulk gel shrinks (syneresis). The air-dried gel has a porous structure with a pore-size distribution in the range of 20–200 Å. The porosity of the final dried gel can be controlled by altering processing parameters such as hydrolysis time, pH, water content, and heat treatment. The gel may then be thermally annealed (700° to 1200° C.) to form a fully dense glass. Fullerenes are thermally stable in an inert atmosphere at least to about 700° C.

The feasibility of synthesizing composite gels by inclusion of optically or electrically active organic guest species has been demonstrated in a number of systems over the past few years. Tunable solid-state dye lasers have been successfully fabricated using sol-gel methodology. Conjugated polymers such as polyparaphenylenevinylene, polypyrrole, and polyaniline have been incorporated into gels via the sol-gel technique. Such composites provide the benefit of a low optical loss inorganic oxide glass along with the desired optical nonlinearities or electrical properties of the guest species. With appropriate processing protocols, composite gels can be formed into monoliths, fibers, or films for the exploitation of desired physical properties of the guest species. However, one drawback with composite glasses reported previously has been that the guest dopants were all organic, and hence, decomposed at temperatures required to form the fully dense glass.

In "The Encapsulation of Organic Molecules and Enzymes in Sol-Gel Glasses: Novel Photoactive, Optical, Sensing, and Bioactive Materials. A Review," by D. Avnir et al., NTIS NO. AD-A244 154/1/HDM, Report No. R/D-5548-MS-01 (1992), and in Chapter 65, Polyaniline-ORMOSIL Nanocomposites, by S. J. Kramer et al., of *Chemical Processing of Advanced Materials*, 1992 John Wiley and Sons, Inc., Larry L. Hench and Jon K. West, editors, the authors describe the incorporation of organic and bioorganic molecules and conjugated polymers, like polyaniline, respectively, into rigid, silica-based matrices using the sol-gel process.

In "Preparation of $C_{70}$-doped Solid Silica Gel via Sol-Gel Process," by Sheng Dai et al., J. Am. Ceram. Soc. 79, 2865 (1992), the authors describe the preparation of transparent oxide glasses containing $C_{70}$ by hydrolysis and condensation of alkoxide precursors. The $C_{70}$ becomes entrapped in the growing covalent gel network rather than being chemically bound to the inorganic matrix. It is well known that $C_{60}$ has much poorer solubility in solvents than $C_{70}$, so it would not be expected that glasses involving $C_{60}$ and derivatives thereof could be fabricated. In fact, the authors reported that "Application of the same process to $C_{60}$ resulted only in a purple silica powder gel.", that is, the method was not effective for $C_{60}$.

Accordingly, it is an object of the present invention to microscopically disperse $C_{60}$ fullerenes and derivatives thereof within a glass gel.

Another object of the invention is to microscopically disperse $C_{60}$ fullerenes and derivatives thereof within a fully dense glass.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for preparing a solid solution of $C_{60}$ or derivatives thereof in a silicon dioxide or other metal alkoxide glass hereof, includes the steps of: 1) preparing a solution comprising a metal alkoxide, a solvent, such as water, and a catalyst for the hydrolysis and condensation of the alkoxide component, forming a sol, 2) preparing a second solution comprising the fullerene dissolved in a solvent, which solvent, when mixed with the first solution and sonicated, forms a monophasic sol, 3) mixing the sol with the second solution, 4) sonicating the resulting sol until a monophasic sol is formed, permitting the monophasic sol to dry, forming a composite metal alkoxide-fullerene gel, and 5) thermally annealing the resulting dry composite gel, whereby a fully dense glass is formed.

It is preferred that a quantity of the solvent is first mixed with the sol before the second solution is added thereto, in order that molecular dispersal of the $C_{60}$ in the resulting glass composite is achieved. Otherwise, nano- and microclusters of $C_{60}$ will be formed therein.

Benefits and advantages of the invention include the low optical loss characteristics of inorganic oxide glasses along with the desired optical nonlinearities of fullerenes and their derivatives, while providing stability for the fullerene by excluding deleterious environmental agents therefrom. With the appropriate processing protocols, composite gels can be formed into monoliths, fibers, or films before thermal annealing to form fully dense glasses.

DETAILED DESCRIPTION OF THE INVENTION

Briefly, the present invention includes a method for exploiting the nonlinear optical properties and electronically conductive and photoconductive properties of fullerenes and derivatives thereof for device applications, by processing the fullerenes into useful solid-state articles. In particular, a direct method is set forth for preparing a solid solution of $C_{60}$ in a silicon dioxide ($SiO_2$) glass matrix using sol-gel chemistry. Sonication has been found to be effective in producing monophasic solutions in both the step of dissolving the $C_{60}$, and the step of mixing of the solution thereby prepared with a sol-gel. Transparent $C_{60}$-gels have been prepared using different concentrations of carrier solvent and reaction temperatures. $C_{60}$ is microscopically dispersed in the glass matrix, and phase-separated microcrystalline regions have also been observed by varying the procedures.

The "sonogel" method was first described by L. Esquivias and J. Zarzycki, in *Proceedings of the Third International Conference on Ultrastructure Processing*, John Wiley & Sons, Inc., New York (1988) pages 255–270. This method involves mixing the immiscible pre-sol reactants and water together in an ultrasonic bath to form a single-phase solution. The sonogel method leads to thorough mixing of the reactants and to the rapid hydrolysis of the precursor alkoxides to generate the sol. Since ultrasound waves produce cavitation effects, that is, local hot spots, reactions were carried out at room temperature and at 5° C. in order to observe temperature effects in the produced gels. It has been observed that adding a quantity of a solvent for the $C_{60}$ to the sol-gel before the addition of the solution of $C_{60}$ thereto, is an essential step for the generation of molecularly dispersed $C_{60}$ in the resulting glass composite. Otherwise, micro- and nanoclusters of $C_{60}$ will be formed therein.

Having generally described the present invention, the following specific examples are provided as a further illustration thereof. $C_{60}$ was purchased from the MER Corporation, Tucson, Ariz. Tetraethylorthosilicate (TEOS) and tetramethylorthosilicate (TMOS) were used as purchased from the Jansen Corporation, Brussels, Belgium. Toluene, dichlorobenzene, and 1-chloronapthalene were used as purchased from Aldrich Chemical, Milwaukee, Wis. A powder diffractometer ($CuK_\alpha$ radiation) was used to obtain diffraction patterns. Ultraviolet visible spectra were taken with a diode array spectrophotometer. Raman spectra were obtained using excitation at 800 nm using a cw Ti:sapphire laser.

Raman scattered light was collected in a backscattering geometry, through a 0.6 m triple monochromator, and detected by a liquid nitrogen-cooled CCD camera. As stated, the $SiO_2$ gels are synthesized by the sonogel method. A "starter" sol is prepared in a composition of 3:1:0.03 molar ratio of water to tetraethoxysilane (TEOS) and tetramethoxysilane (TMOS) to HCl (added as a catalyst). The initial precursors are mixed and immediately sonicated in an ultrasonic bath.

EXAMPLE 1

Preparation of Porous Air-Dried $SiO_2$ Gels:

$SiO_2$ glass monoliths and thin films were prepared by the sonogel method with the coaddition of toluene. Effects of different concentrations of toluene in the drying process were observed. Cosolvents, such as toluene, were removed by washing with ethanol during the early stages of gellation, and a room temperature synthetic procedure produces fracture-free optical quality $SiO_2$ glass is demonstrated. The gels can then be densified by thermal annealing.

Two precursor solutions (A) and (B) were prepared in the following manner. Pre-sol (A) was prepared in a 100 ml flask and consisted of 11 ml of TMOS (10.95 g, 0.0719 mol) and 5 ml deionized water (4.96 g, 0.275 mol). Two drops of 38% HCl were added to solution (A), which resulted in a highly exothermic hydrolysis reaction, whereby the solution became a cloudy monophasic solution after several minutes. Thirty ml of TEOS (27.33 g, 0.131 mol), 7.5 ml deionized water (7.51 g, 0.691 mol), and 11 ml TMOS (11.01 g, 0.145 mol) were added to another 100 ml flask to form pre-sol (B). Solution (A) was rapidly added to solution (B) by direct pouring to form the sol. After these initial precursors were mixed together and sonicated in an ultrasonic bath at room temperature for about 40 minutes, a cloudy monophasic sol resulted. The combined molar ratio of $TEOS:TMOS:H_2O$ was 1:1.1:5.3. The sol was returned to the ultrasonic bath for further use.

Three sample sets were made with varying toluene concentrations and labeled accordingly. Fourteen ml of the sol was added to each of three 25 ml beakers. To each solution, respectively, 2, 4, and 6 ml of toluene was added by means of a pipette. Each solution was then agitated to mix in the toluene. One ml aliquots from each solution were added to 10 ml Teflon (PTFE) containers and covered with one barrier layer of parafilm. The semipermeable barrier permitted the slow absorption of atmospheric moisture and the evaporation of the reaction products (ethanol and methanol) and the toluene cosolvent. One sample was made without toluene as a reference.

Samples prepared with 6 and 4 ml toluene formed solid gels after 88 hours. The samples prepared with 2 ml toluene required twice that length of time to gel. One sample from each treatment group was washed 3 times with 10 ml ethanol to remove excess toluene from the porous gel structure. The parafilm barrier of each sample in all treatment groups was punctured, with increasing numbers of pin-holes added each day, to facilitate solvent evaporation and drying. Shrinkage from the wall of the container was observed after 4 days for samples prepared with 4 and 6 ml of toluene, and after 6 days for samples prepared with 2 ml of toluene. The parafilm barriers were removed from each sample after 8 days. Air dried sample dimensions were 13 mm wide and 3 mm thick. Each sample was left to air-dry under ambient conditions until it was thermally annealed.

EXAMPLE 2

Thermal Annealing of Air-Dried Gels from Example 1 to Form High Optical Quality Dense Glass:

Porous air-dried $SiO_2$ gels were densified by heat treatment to give fracture-free high optical quality glass, and thin (<1 μm) nonporous films were fabricated.

The air-dried monoliths, prepared in accordance with Example 1 hereof, were placed in an oven and held at 50° C. for 7 days. The dry monoliths were then heated at a rate of 2° C./min to 500° C. and held at that temperature for 1 hour. The glass was subsequently brought to 700° C. at a rate of 2° C./min and held at that temperature for 1 hour. This annealing procedure was found to generate a fully densified glass with properties similar to fused silica.

Thin film coatings (<1 μm) were prepared by rapidly (≈30 cm/min) dipping a glass slide into a beaker containing the sol (25 and 50 hours after preparation), and then slowly (1–15 cm/min) removing it. The slides were placed in jars and covered with a parafilm barrier for 24 hours. The films were then placed in an oven and held at 50° C. for 3 days. The films were subsequently heated at 2° C./min to 500° C. for 1 hour, and then brought to 700° C. at a rate of 2° C./min for 1 hour. This annealing procedure was found to produce a fully densified glass film with properties similar to fused silica.

EXAMPLE 3

Preparation of $SiO_2$ Glass by Low-Temperature Hydrolysis of the Precursor Sol in the Presence of Different Cosolvents:

$SiO_2$ glass monoliths and thin films can be prepared by the sonogel method with the coaddition of other sol compatible solvents such as dichlorobenzene, but not with sol incompatible solvents such as 1-chloronapthalene. The effect of reducing the pre-sol solution temperature to 0° C. is also investigated.

Pre-sols were made in a similar fashion as described in Example 1, hereof. Solution (A) was comprised of TMOS (10.87 g) and deionized water (5.04 g). Solution (B) included TEOS (27.50 g), TMOS (10.84 g), and deionized water (7.52 g). Solutions (A) and (B) were then placed in a freezer for 2 hours. Both of the chilled pre-sols were subsequently sonicated in an ice water bath. Two drops of 38% HCl were added to solution (A) which yielded a clear single-phase solution. Heat evolution following the addition of acid to pre-sol (A) was not observed. Solution (A) was then added dropwise to solution (B) with sonication. A clear, single-phase sol resulted after several minutes. Seven ml (7.11 g) increments were added to respective 10 ml beakers. One, two or three ml of either toluene, chloronapthalene, or dichlorobenzene were added to each beaker. The sol and cosolvent mixtures were mechanically stirred to insure homogeneity. The sol-1-chloronapthalene solutions form a biphasic solution, even with rigorous sonication, and hence, 1-chloronaphthalene is incompatible with the sol. A 1 ml portion of the toluene-sol and dichlorobenzene-sol were then piperted into a PTFE container and covered with a barrier layer of parafilm. The gellation and drying properties for these samples were found to be nearly identical to those described in Example 1 hereof.

EXAMPLE 4

Preparation of Thin Films and Monolithic Articles from SiO₂ Gels Prepared in Example 3:

Porous, air-dried $SiO_2$ gels are densified by heat treatment to give fracture-free high optical quality glass. Thin (<1 μm), nonporous films are also produced.

The air-dried monoliths prepared in Example 3 hereof were placed in an oven and held at 50° C. for 7 days. The dried monoliths were heated at 2° C./min to 500° C. for 1 hour. The glass was then brought to 700° C. at a rate of 2° C./min for 1 hour. This annealing procedure was found to produce a fully densified glass with properties similar to fused silica.

Thin film coatings (<1 μm) were prepared by rapidly (≈30 cm/min) dipping a glass slide into a beaker containing the sol (25 and 50 hours after preparation), and then slowly (1–15 cm/min) removing it. The slides were placed in jars and covered with a parafilm barrier for 24 hours. The films were subsequently placed an in oven and held at 50° C. for 3 days, following which the films were heated at 2° C./min to 500° C. for 1 hour. The glass film was then brought to 700° C. at a rate of 2° C./min for 1 hour. This annealing procedure was found to produce a fully densified glass film with properties similar to fused silica.

EXAMPLE 5

Preparation of SiO₂ Glass with C₆₀ Micro- and Nanoclusters by Low Temperature Hydrolysis of the Prescursor Sol as a Function of Different Cosolvents Containing C₆₀:

$C_{60}$—$SiO_2$, glass monoliths and thin films are prepared by the sonogel methods described in Examples 1 and 2 hereof. Coaddition of saturated solutions of $C_{60}$; for example, in dichlorobenzene and toluene, results in suspensions of $C_{60}$ which aggregate into micro- and nano-$C_{60}$ clusters suspended in the dried $SiO_2$ gel matrix.

The starter sol was prepared in accordance with Example 1 hereof. Seven ml increments of the sol are added to each of six 25 ml beakers. One, two, or three ml of a saturated toluene solution of $C_{60}$ (2 mg/ml) were added to each of 3 beakers containing the sol. One, two, or three ml of a saturated dichlorobenzene solution of $C_{60}$ (20 mg/ml) were then added to each of the remaining 3 beakers containing the sol. Upon addition of the purple $C_{60}$ solutions to the sol-gel solution, a milky brown suspension forms which clouds the solution. One ml portions of these solutions were pipetted into PTFE containers and aged as in Example 2 hereof. The final dried gel was found to have $C_{60}$ clusters trapped as micro- and nanocrystalline suspensions in the final gel.

EXAMPLE 6

Preparation of Molecularly Dispersed C₆₀ in SiO₂ Glass by Room Temperature Hydrolysis of the Precursor Sol as a Function of Different Cosolvents Containing C₆₀:

Molecularly dispersed $C_{60}$ in $SiO_2$ is produced in air-dried porous gels that have identical optical properties to those found in $C_{60}$ solutions. Neutral carrier solvents were added to the sols prior to adding the $C_{60}$ solution. The concentration of $C_{60}$ was adjusted in the dried gel to give light transmission over the range from 10 to 90% T.

Starter sols were prepared in accordance with the procedures cited in Example 1 hereof. Seven ml increments of the sol were added, respectively, to each of six 25 ml beakers along with 2 mil of toluene or 2 ml of dichlorobenzene. One, two, or three ml of a saturated $C_{60}$ toluene solution (2 mg/ml) were added to each of 3 beakers containing the sol-toluene mixture. One, two, or three ml of a saturated $C_{60}$ dichlorobenzene solution (20 mg/ml) were added to each of 3 beakers containing the sol-dichlorobenzene mixture. The purple sol-$C_{60}$ sols were then pipetted into PTFE containers, covered with a layer of barrier parafilm, and aged as described in Example 1 hereof. The final dried gel shows $C_{60}$ to be chemically unmodified by this procedure as was evidenced by Raman spectroscopy. X-ray diffraction patterns obtained for the gels further showed that the $C_{60}$ does not form micro-or nanocrystalline clusters as in the gel composites of Example 5 hereof. It is important to stress at this point that the addition of the sol-gel-compatible solvent to the sol-gel before the addition of the saturated solution of the $C_{60}$ thereto, is essential to forming molecularly dispersed $C_{60}$ in the resulting composite glasses. Otherwise, nano- and microclusters of $C_{60}$ will be formed therein.

EXAMPLE 7

Preparation of Thin Films and Monolithic Articles from C₆₀—SiO₂ Gels of Example 6:

Porous air-dried $SiO_2$ gels are densified by heat treatment to produce fracture-free high optical quality glass. Thin (<1 μm) nonporous films are also produced.

The procedure described in Example 2 hereof is followed, yielding identical results thereto.

EXAMPLE 8

Preparation of Molecularly Dispersed C₆₀ in SiO₂ Glass by Low Temperature Hydrolysis of the Precursor Sol as a Function of Different Cosolvents Containing C₆₀:

Molecularly dispersed $C_{60}$—$SiO_2$ air-dried porous gels having identical optical properties to those found in $C_{60}$ solutions are prepared. The addition of neutral carrier solvent prior to adding the $C_{60}$ solution is essential to the success of the method. Concentration of $C_{60}$ in the dried gel may be adjusted to yield light transmission over the range from 0.1 to 99.9% T.

A starter sol was prepared in accordance with the procedures cited in Example 3 hereof. Seven ml increments of the sol are added, respectively, to each of six 25 ml beakers along with two ml of toluene or two ml of dichlorobenzene. One, two, or three ml of a saturated $C_{60}$ toluene solution (2 mg/ml) were added to each of 3 beakers containing the sol-toluene mixture. One, two, or three ml of a saturated $C_{60}$ dichlorobenzene solution (20 mg/ml) were added to each of 3 beakers containing the sol-dichlorobenzene mixture. One ml portions of the resulting purple sol-$C_{60}$ solutions from each of these $C_{60}$-sols were pipetted into PTFE containers, covered with a layer of barrier parafilm, and aged as described in Example 1 hereof. The final dried gel showed the $C_{60}$ to be chemically unmodified by the method as was evidenced by the Raman spectrum. X-ray diffraction patterns obtained for gels showed clearly that the $C_{60}$ does not form micro- or nanocrystalline clusters as in the gel composites of Example 5 hereof.

EXAMPLE 9

Preparation of Thin Films and Monolithic Articles from $C_{60}$—$SiO_2$ Gels of Example 8:

Porous air-dried $C_{60}$-$SiO_2$ gels were densified by heat treatment to give fracture-free high optical quality glass. Additionally, thin (<1 μm) nonporous $C_{60}$-$SiO_2$ films were produced.

The procedure described in Example 2 hereof was followed, yielding identical results.

The progression of absorption spectra observed while the gelation process proceeded according to the procedure set forth in Example 8 indicates that the $C_{60}$ is unmodified and in solution during this process. All absorption features were preserved; the principal difference in the spectra is the appearance of a broad scattering background as the materials contracts and forms microscopic voids which strongly scatter the light.

Raman spectroscopy was employed in order to verify that the $C_{60}$ survived the sol-gel processing intact. This technique provides a sensitive probe of the structure of individual fullerene molecules; in addition, the Raman modes are weakly coupled to the local environment. These Raman spectra show that the totally symmetric modes of the individual $C_{60}$ molecules are preserved in the gel, and thus provide conclusive evidence that $C_{60}$ was incorporated intact into the $SiO_2$ glass matrix in the sol-gel process.

Since the fullerene Raman modes are weakly coupled to the local environment, Raman spectroscopy also probes the nature of the fullerenes in the sol-gel glass. There is evidence for different microscopic distributions of the fullerenes for the samples prepared with and without sonication. For the bulk $SiO_2$/$C_{60}$ sonogel prepared both with and without sonication, the downward shift and splitting of the 273.5 $cm^{-1}$ mode is more pronounced. These results strongly suggest that the $C_{60}$ in the gels prepared according to the procedures of Examples 6 and 8 hereof, is microscopically dispersed throughout the glass. The X-ray diffraction measurements support this conclusion. By contrast, optical measurements suggest that aggregates of $C_{60}$ are formed in sonogels prepared according to the procedures of Example 5 hereof.

Therefore, excellent optical quality gels containing variable amounts of $C_{60}$ are produced by the sonogel method. The criteria for making true molecular solid solutions are: a) selection of an appropriate solvent for delivering $C_{60}$ to the sol; b) selecting a good solvent for $C_{60}$ that is also compatible with the sol; c) the addition of the $C_{60}$ delivery solvent to the sol prior to adding a); and d) sonication of the pre-sol at room temperature. Applications of the materials described herein based on nonlinear optical behavior include optical limiting and optical signal processing.

The foregoing description of the invention has been presented for purposes of illustration and description and is not intended to be exhaustive or to limit the invention to the precise form disclosed, and obviously many modifications and variations are possible in light of the above teaching. For example, it would be apparent to one skilled in the art of fullerenes, after having studied the present disclosure, that derivatives of $C_{60}$ can also be incorporated into sol-gels by the same procedure.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing a solid solution of $C_{60}$ in a silicon dioxide glass, which comprises the steps of:
   a. preparing a solution comprising a metal alkoxide, water, and a catalyst, forming thereby a sol;
   b. preparing a second solution comprising $C_{60}$ dissolved in a solvent which solvent, when mixed with the first solution and sonicated, forms a monophasic sol;
   c. mixing the sol with the second solution;
   d. sonicating the resulting sol until a monophasic sol is formed;
   e. permitting the monophasic sol to dry; and
   f. thermally annealing the resulting dry sol; whereby a fully dense glass is formed.

2. The method as described in claim 1, wherein a quantity of the neat solvent utilized in said step of preparing a second solution comprising $C_{60}$ is first mixed with the sol before said step of mixing the sol with the second solution.

3. The method as described in claim 1, wherein the components of the first solution are cooled before said step of preparing a first solution.

4. The method as described in claim 1, wherein the solvent for $C_{60}$ compatible with the sol is selected from the group consisting of toluene and dichlorobenzene, and mixtures thereof.

5. The method as described in claim 1, wherein the metal alkoxide includes silicon alkoxides.

6. The method as described in claim 5, wherein the silicon alkoxides include tetraethylorthosilicate and tetramethylorthosilicate.

7. The method as described in claim 6, wherein the catalyst includes hydrochloric acid.

8. The method as described in claim 1, wherein said step of preparing a solution comprising a metal alkoxide, water, and a catalyst, forming thereby a sol, further comprises the steps of forming a first precursor solution comprising tetramethylorthosilicate, water, and hydrochloric acid, forming a second precursor solution comprising tetraethylorthosilicate, water, and tetramethylorthosilicate, and mixing the first precursor solution with the second precursor solution.

9. The method as described in claim 3, wherein the $C_{60}$ is dissolved in the solvent therefor by using sonication; whereby a saturated solution is formed.

10. A method for preparing a solid solution of derivatives of $C_{60}$ in a silicon dioxide glass, which comprises the steps of:
    a. preparing a solution comprising a metal alkoxide, water, and a catalyst, forming thereby a sol;
    b. preparing a second solution comprising the derivative of $C_{60}$ dissolved in a solvent which solvent, when mixed with the first solution and sonicated, forms a monophasic sol;
    c. mixing the sol with the second solution;
    d. sonicating the resulting sol until a monophasic sol is formed;
    e. permitting the monophasic sol to dry; and
    f. thermally annealing the resulting dry sol; whereby a fully dense glass is formed.

* * * * *